June 8, 1965 V. SANTARELLI 3,187,952
SPREADER WITH MEANS FOR REGULATING DISCHARGE
Filed Oct. 23, 1963 6 Sheets-Sheet 2
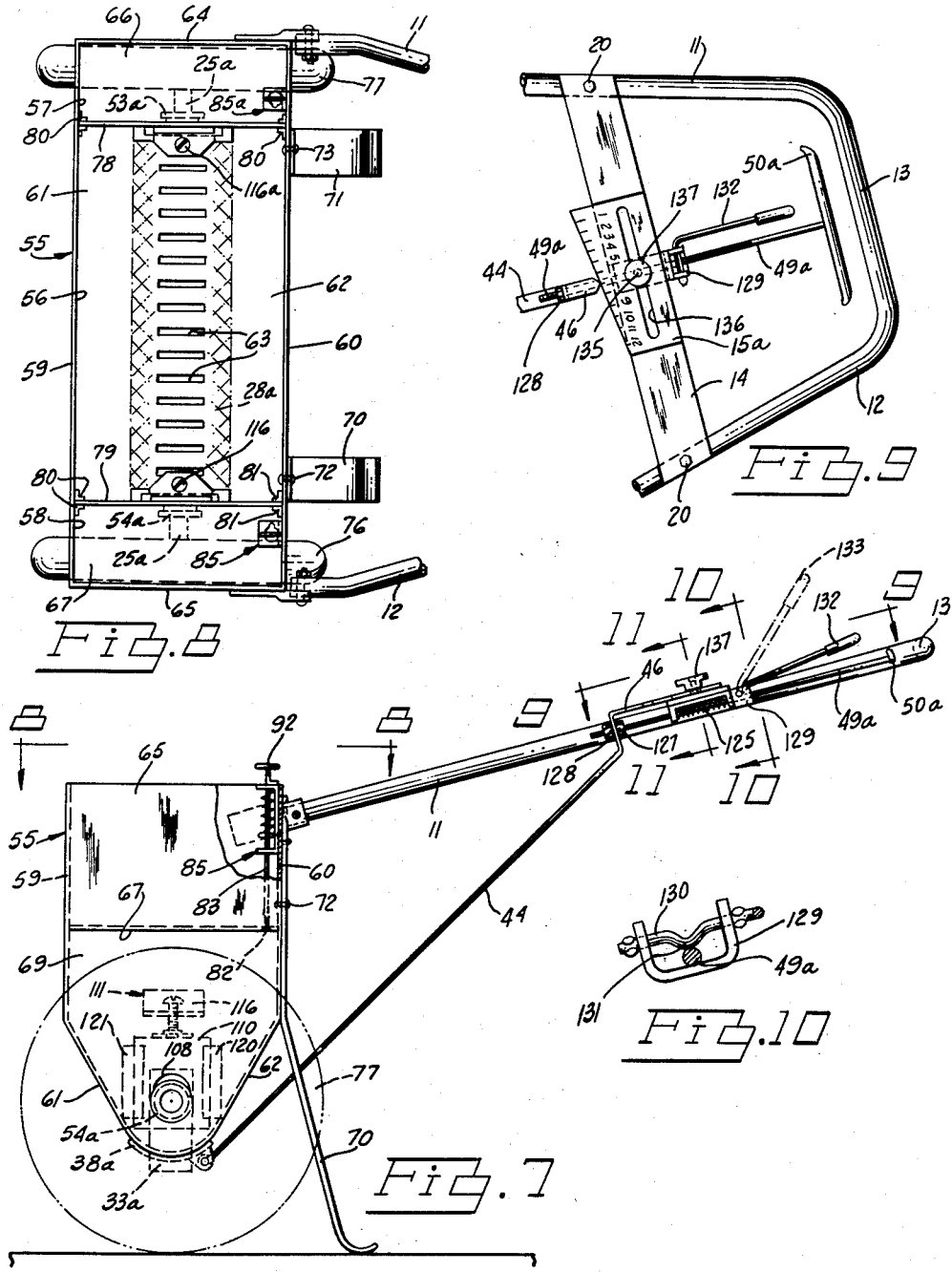

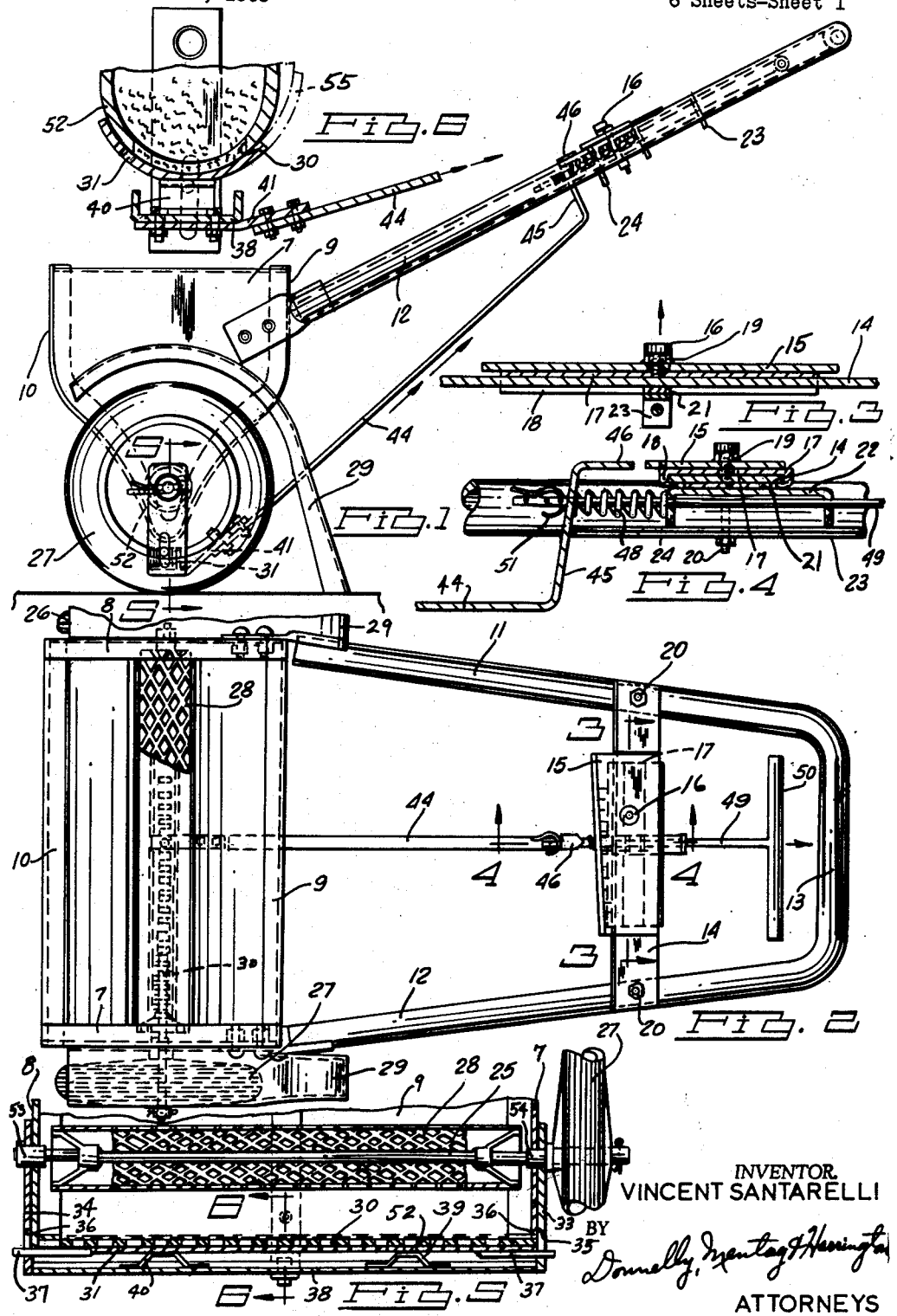

June 8, 1965     V. SANTARELLI     3,187,952
SPREADER WITH MEANS FOR REGULATING DISCHARGE
Filed Oct. 23, 1963     6 Sheets-Sheet 3

*INVENTOR.*
VINCENT SANTARELLI
BY
Donnelly, Mentag & Harrington
ATTORNEYS

June 8, 1965 V. SANTARELLI 3,187,952
SPREADER WITH MEANS FOR REGULATING DISCHARGE
Filed Oct. 23, 1963 6 Sheets-Sheet 4

INVENTOR.
VINCENT SANTARELLI
BY
ATTORNEYS

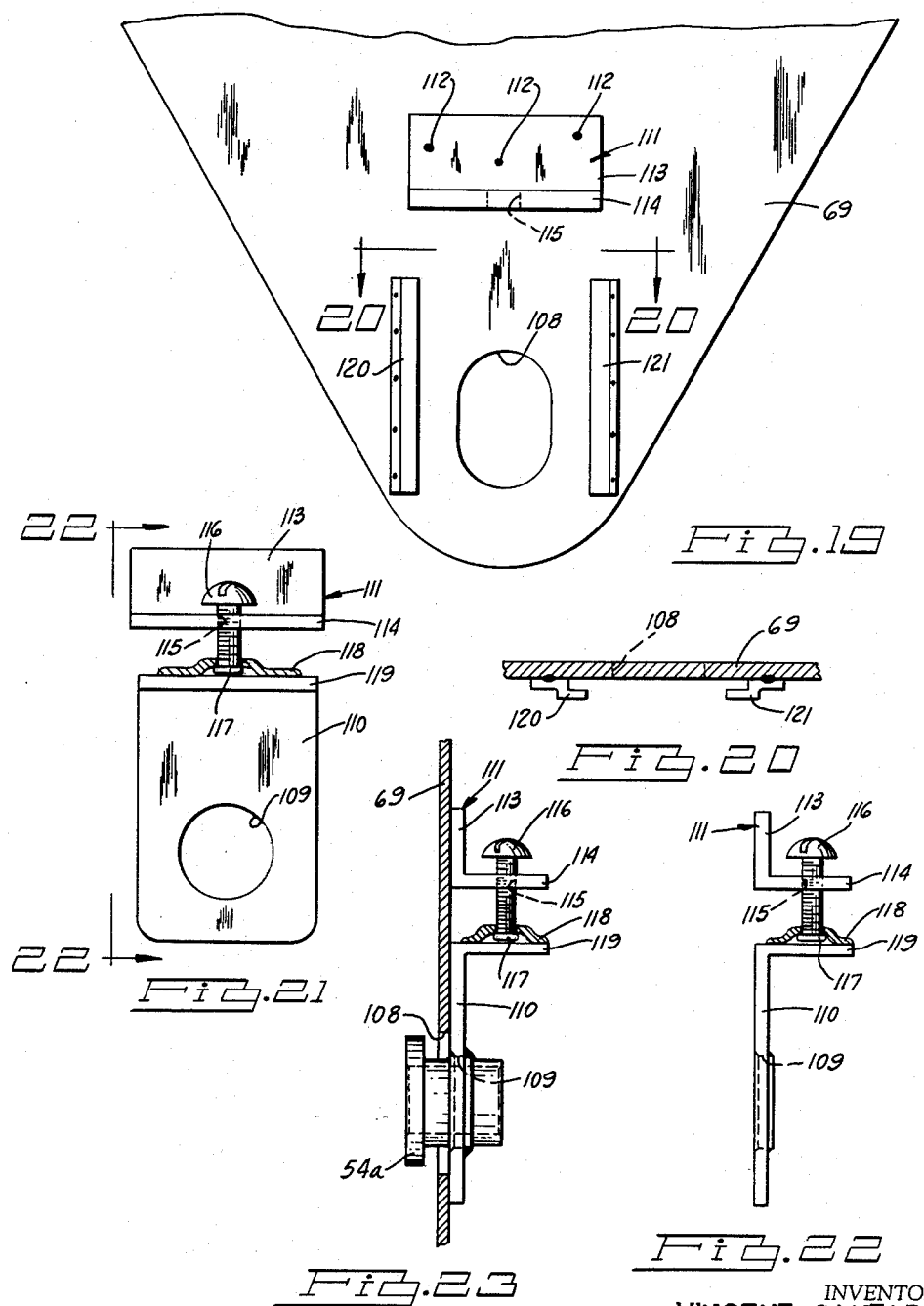

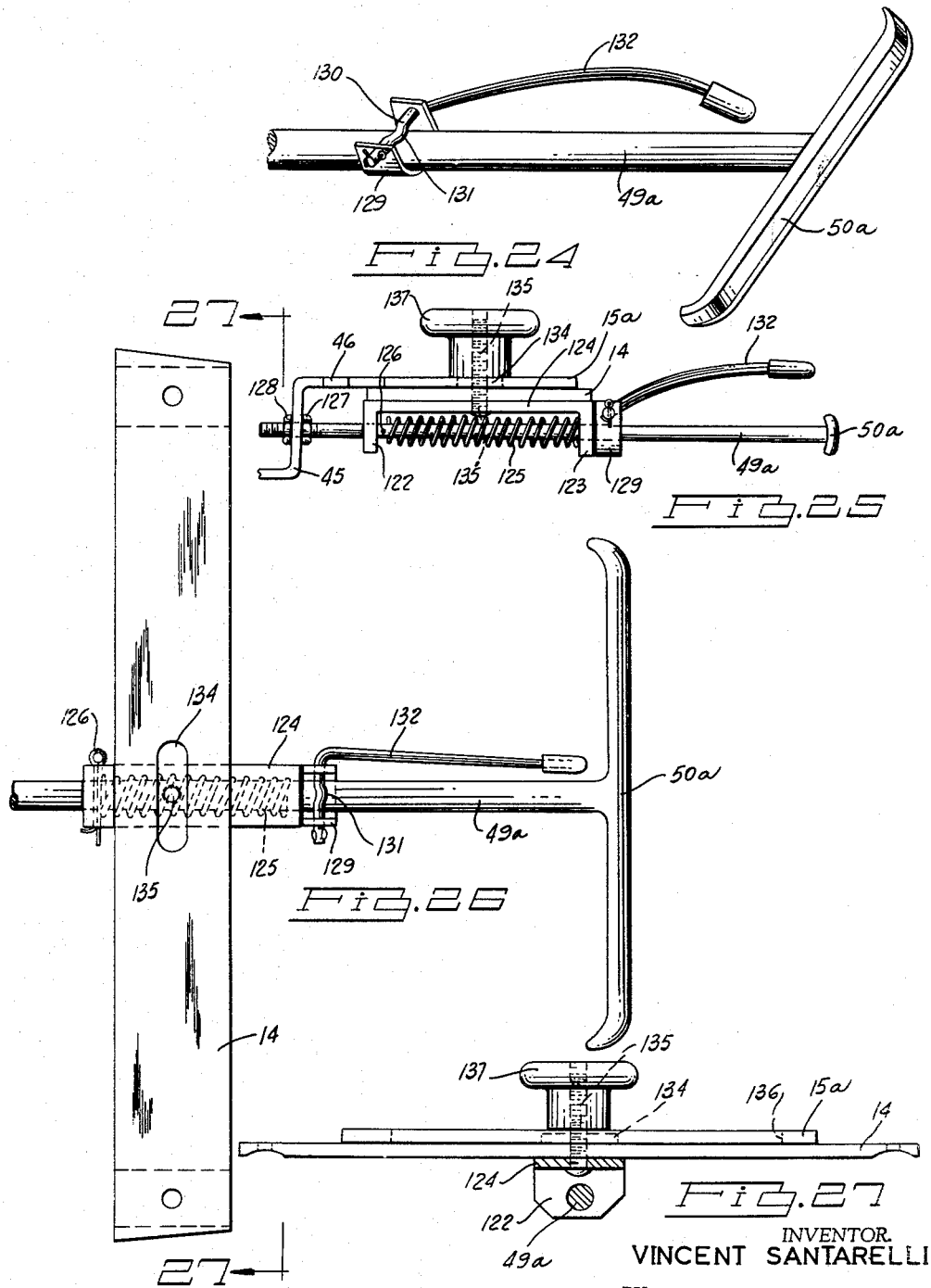

United States Patent Office 3,187,952
Patented June 8, 1965

3,187,952
SPREADER WITH MEANS FOR REGULATING DISCHARGE
Vincent Santarelli, 27551 Gail, Warren, Mich.
Filed Oct. 23, 1963, Ser. No. 318,448
15 Claims. (Cl. 222—129)

This application is a continuation-in-part of application Serial No. 153,083 filed November 17, 1961, now abandoned.

My invention relates to a new and useful improvement in a spreader device adapted for use in spreading seeds, fertilizer and the like.

It is an object of the present invention to provide a device of this class which will be simple in structure, economical of manufacture, durable, compact and highly efficient in use.

Another object of the invention is the provision in a spreader of this class of a means for regulating a plurality of spreader discharge openings wherein a shielding device for determining the amount of exposure of the discharge openings is spring closed and manually operable.

Another object of the invention is the provision in a spreader of this class of a cover plate for determining the amount of exposure of spreader discharge openings and which cover plate is spring pressed into closing position.

Another object of the invention is the provision in a spreader of this class of a regulating plate for determining the amount of exposure of spreader discharge openings and which regulating plate engages an indicator carried on a control bar, upon the movement of a cover plate to opening position relative to the discharge openings, against the tension of a spring.

Another object of the invention is the provision in a spreader of this class of a rotatable agitator of a foraminate material.

Another object of the invention is the provision in a spreader of this class of a hopper having means for storing a marking material and means for depositing the marking material on the ground during movement of the spreader to show the ground covered by the spreader.

Another object of the invention is the provision in a spreader of this class of an agitator which is adjustable to provide easy and accurate spreading of material ranging from the finest grass seed to pelletized fertilizer.

Another object of the invention is the provision in a spreader of this class of a shutter control which is adapted to be locked in any desired open position and quickly operated for closing the shutter.

Other objects will appear hereinafter.

The invention consists of the structure illustrated, but it is understood that the disclosure is but the preferred embodiment and that variations and modifications may be made in the detail of the structure disclosed.

Forming a part of the disclosure are drawings in which,

FIG. 1 is a side elevational view of the invention,

FIG. 2 is a top plan view of the invention, with parts broken away,

FIG. 3 is an enlarged, fragmentary sectional view taken on line 3—3 of FIG. 2,

FIG. 4 is an enlarged, fragmentary sectional view taken on line 4—4 of FIG. 2,

FIG. 5 is an enlarged, fragmentary sectional view taken on line 5—5 of FIG. 2,

FIG. 6 is an enlarged, fragmentary sectional view taken on line 6—6 of FIG. 5,

Figure 13:
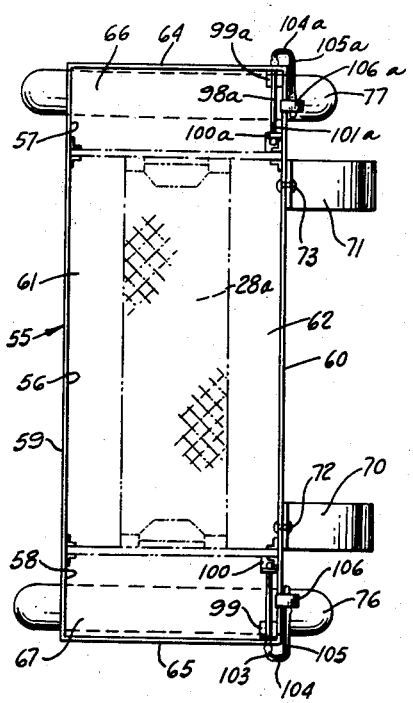
Figure 11:
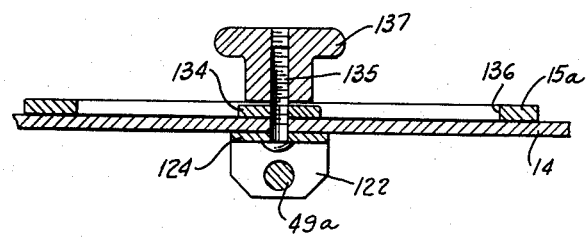
Figure 12:
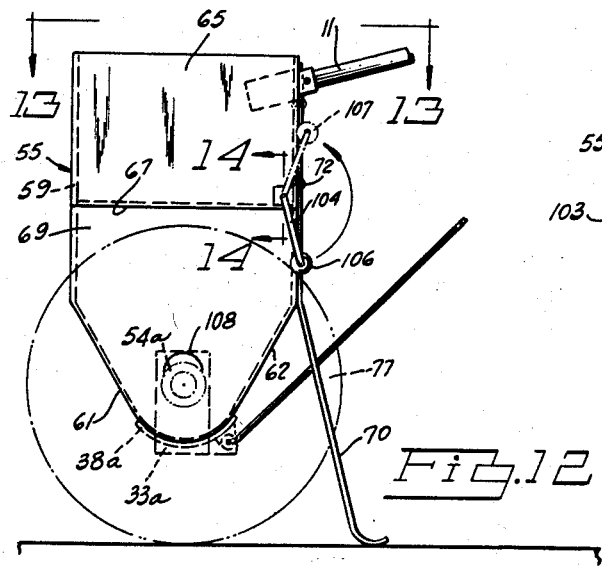
Figure 14:
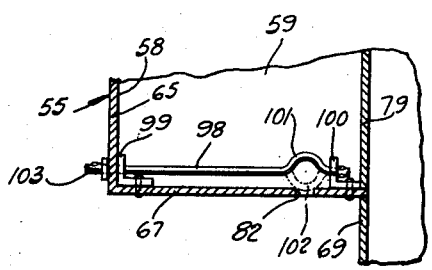
Figure 15:
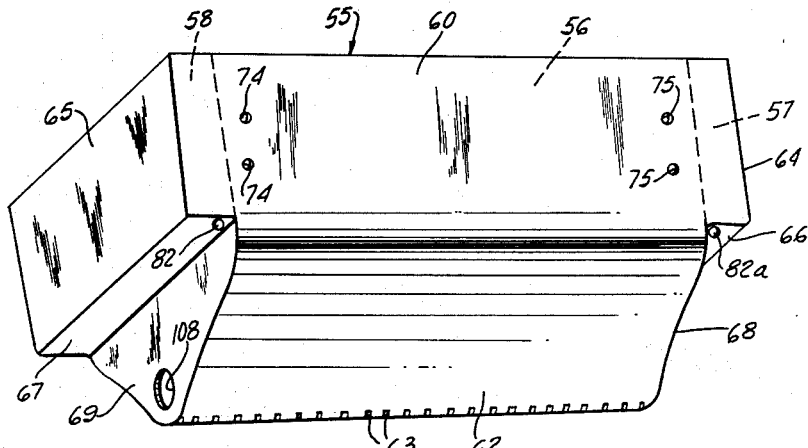
Figure 17:
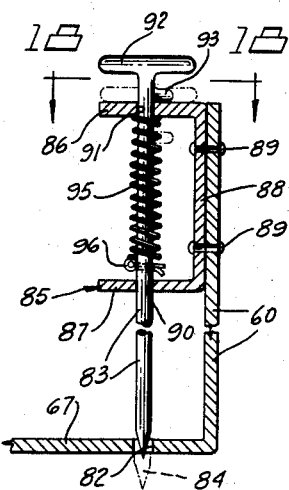
Figure 16:
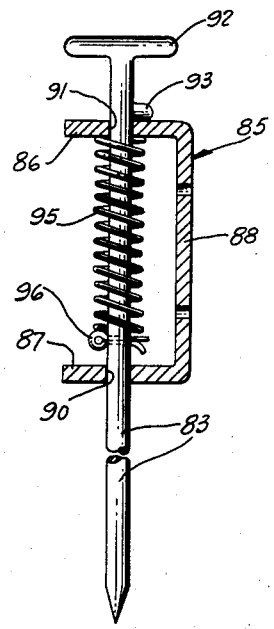
Figure 18:
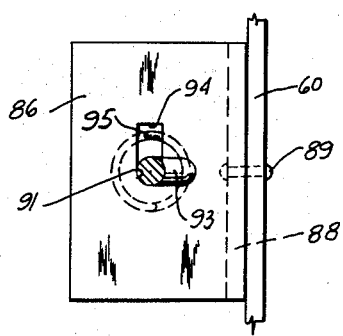

FIG. 7 is a side elevational view, with parts broken away, of a second embodiment of the invention which is provided with a marking material means and a modified shutter control means, FIG. 8 is a top view, with parts broken away, of the hopper structure illustrated in FIG. 7, FIG. 9 is a fragmentary top plan view of the shutter control structure illustrated in FIG. 7, taken along the line 9—9 and looking in the direction of the arrows, FIG. 10 is a fragmentary enlarged view of the structure illustrated in FIG. 7, taken along the line 10—10 and looking in the direction of the arrows, FIG. 11 is a fragmentary enlarged view of the structure illustrated in FIG. 7, taken along the line 11—11 and looking in the direction of the arrows, FIG. 12 is a fragmentary side elevational view of a third embodiment of the invention illustrating a second marking material depositing structure, FIG. 13 is a top view of the structure illustrated in FIG. 12, FIG. 14 is a fragmentary elevational sectional view of the structure illustrated in FIG. 12, taken along the line 14—14 and looking in the direction of the arrows, FIG. 15 is a perspective view of the modified hopper provided with compartments for storing the marking material, FIG. 16 is a side elevational view of a first means for regulating the flow of marking material from the hopper, FIG. 17 is a fragmentary elevational sectional view showing the flow control structure of FIG. 16 mounted in the closed position in a hopper, FIG. 18 is an enlarged top plan view of the upper bracket of the structure shown in FIG. 17, taken along the line 18—18 thereof, and looking in the direction of the arrows, FIG. 19 is a fragmentary enlarged view of the agitator adjusting supporting structure mounted on the hopper, FIG. 20 is a horizontal fragmentary sectional view of the structure illustrated in FIG. 19, taken along the line 20—20 thereof, and looking in the direction of the arrows, FIG. 21 is a front elevational view of an adjustment bracket for the adjustable agitator, FIG. 22 is a side elevational view of the structure illustrated in FIG. 21, taken along the line 22—22 thereof and looking in the direction of the arrows, FIG. 23 is a side elevational view similar to FIG. 22 and showing the agitator adjustment structure mounted on the end wall of the hopper, FIG. 24 is a fragmentary perspective view of the shutter locking means, FIG. 25 is a fragmentary side elevational view of the shutter locking means, FIG. 26 is a top plan view of the shutter control structure and regulator plate, and FIG. 27 is a reduced fragmentary elevational sectional view of the structure illustrated in FIG. 26, taken along the line 27—27 and looking in the direction of the arrows.

As shown in the drawings, the invention comprises a hopper having end walls 7 and 8, side walls 9 and 10, and a bottom wall 52. Attached at one of the end walls of the hopper are handles 11 and 12 forming the legs of a yoke and having a gripping portion 13. The yoke legs 11 and 12 are connected by a cross bar 14 slidable on which is a gauge plate 15 which is carried on an abutment plate 17 having the in-turned ends 18 clinched upon the cross bar 14.

Threaded into a nut 19 which is fixedly mounted on the plate 15 is a screw 16 which passes through the plates 15 and 17 and serves to bear against the plate 14 for retaining the plate 15 in its various adjusted positions longitudinally across the cross bar 14. Stay bolts 20 are projected through the plate 14 and through the yoke legs 11 and 12.

Soldered or suitably secured to the under-surface of the plate 14 is a plate 21 and soldered or otherwise suitably secured to the plate 21 is a yoke 22 having oppositely disposed depending legs 23 and 24.

Projected through the hopper through the lower end thereof is a shaft 25 on which are fixedly mounted traction wheels 26 and 27 so that a rotation of the same will rotate the shaft 25. Fixedly mounted on the shaft 25 is an agitator 28 of a foraminate nature and which is circular in cross section. Supporting legs 29 are mounted on the end walls and serve as a means for supporting the mechanism in the position shown in FIG. 1 when not in use.

Formed in the bottom wall 52, at the center thereof, are longitudinally spaced apart openings 30 which extend transversely of the bottom. These openings 30 are adapted to be closed and opened by means of an arcuately shaped plate 31 which is adapted to be rocked about the bottom wall 52 as explained hereinafter. Swingably mounted on the bushings 53 and 54 on the shaft 25 of the hopper and extending downwardly therefrom are the support arms 33 and 34 in each of which is formed an elongated vertical slot 35 and 36, respectively, and which each receive a stud 37 secured to the plate 31 on each end thereof. A plate 38 is rigidly connected to the lower ends of the support arms 33 and 34, and mounted on the plate 38 are springs 39 and 40 which bear against the lower side of plate 31 and serve to retain it pressed against the bottom wall 52.

Secured to the plate 38 at the center portion thereof is a flexible arm 41 which is connected to a bar 44 which has an upwardly turned end 45 and the angularly end indicating pointer 46 at the upper end. A rod 49 is slidably projected through the yoke legs 23 and 24 and through the member 45. This rod is provided at its end with a cotter pin 51. The rod 49 is projected through a spring 48, one end of which bears against the angularly turned portion 45 and the other end of which bears against the leg 24. A hand grip 50 is mounted on the end of the rod 49 which can be gripped by the operator while holding the handle gripping portion 13. By moving the hand grip 50 toward the handle 13, the cover plate 31 which is held in closing position by means of the spring 48 will be rocked from the solid line position shown in FIG. 6 to the dotted line position 55. The movement of the bar 44 to the right, as viewed in FIGS. 1 and 6, will rock the plate 38 and the arms 33 and 34, whereby the cover plate 31 will also be rocked because of the engagement of the pins 37 in the slots 35 and 36 in the arms 33 and 34. In this manner the operator may regulate the amount of material discharged from the hopper. As the spreader is moved, the agitator 28 will rotate and direct the seeds or fertilizer deposited in the hopper to the openings in the bottom wall 52. In the movement of the cover plate 31, it will remain in close contact with the bottom wall 52 due to the spring pressure of the springs 39 and 40. It will be understood that the tapered front edge of plate 15 regulates the distance that the bar 44 may be moved and so regulates the rocking movement of the cover plate 31 and the amount of exposure of openings 30.

FIGURES 7 through 11 and 15 through 27 illustrate a second embodiment of the invention which includes a means for storing a marking material and for depositing the same on the ground during movement of the spreader to show the ground which has been covered by the spreader. The second embodiment also includes an adjustable agitator to provide easy and accurate spreading of material ranging from the finest grass seed to pelletized fertilizer. The second embodiment also includes a shutter control which is adapted to be locked in any desired open position and quickly operated for closing the same. FIGURES 12 through 14 illustrate a second modification of a means for controlling the flow of marking material from the marking material storage chamber.

As illustrated in FIGURES 7, 8 and 15, the hopper of the second embodiment is generally indicated by the numeral 55. The hopper 55 is substantially the same as the hopper of the first embodiment, but it has been modified to provide material marking storage compartments at each end thereof. As shown in FIGURES 8 and 15, the hopper 55 is provided with the central compartment 56 which is adapted to receive the material which is to be spread on the ground, and the end storage compartments 57 and 58 for storing the marking material.

As shown in FIGURES 8 and 15, the hopper 55 includes the spaced apart side walls 59 and 60 which are vertically disposed and which extend lengthwise of the hopper to form the side walls of the marking material compartments 57 and 58. The lower ends of the side walls 59 and 60, slope inwardly and are joined at the bottom ends thereof to form the bottom wall of the hopper and these sloping lower ends of the walls are indicated by the numerals 61 and 62. The hopper 55 is provided with a plurality of longitudinally disposed, spaced apart openings 63 which are similar to openings 30 in the first embodiment and which function to discharge the material which is to be spread from the central storage compartment 56.

The hopper 55 is provided with the vertical end walls 64 and 65 which enclose the ends of the side walls 59 and 60 and form the outer end walls of the marking material storage compartments 57 and 58. As shown in FIGURE 15, the marking material storage compartments 57 and 58 do not extend downwardly to the bottom of the hopper, but terminate at a point slightly above the upper ends of the sloping hopper bottom walls 61 and 62. The marking material compartments 57 and 58 are enclosed at the lower end thereof by the bottom walls 66 and 67 which are horizontally disposed and which extend inwardly to the lower end walls 68 and 69, respectively, of the bottom end of the hopper 55. The hopper 55 is formed from any suitable material, as for example, a lightweight metal material and the various aforedescribed walls may be fixedly connected to each other by any suitable means as by welding.

The hopper is provided with a pair of supporting legs 70 and 71 which are fixedly secured to the rear side of the hopper by any suitable means, as for example, by means of the rivets 72 and 73 which pass through holes 74 and 75 in the hopper rear wall 60. The hopper 55 is adapted to be supported by suitable wheels as 76 and 77 which are the same as the wheels 27 of the first embodiment. The wheels 76 and 77 would be mounted on a shaft 25a as illustrated in FIGURE 8 in the same manner as the wheels 27 are mounted on the shaft 25 as shown in FIGURE 5 of the first embodiment. The shaft 25a is adapted to carry the agitator 28a which is constructed the same as the agitator 28 shown in the first embodiment of FIGURES 1 through 6.

As shown in FIGURE 8, the hopper 55 is provided with the transversely disposed intermediate walls 78 and 79 which are spaced apart inwardly from the end walls 64 and 65, respectively, to form the inner end walls of the marking material storage compartments 57 and 58. The walls 78 and 79 may be made from plates of sheet metal which may be slidably mounted in place between suitable members fixedly mounted on the inside of the hopper walls 59 and 60. As illustrated, the wall 78 is held in place between a pair of vertically disposed angle members 80 which are welded to the inner sides of the side walls 59 and 60. The wall 79 is similarly secured in place by a plurality of similar angle irons 81.

The material which is used for marking purposes and stored in the compartments 57 and 58, may be any suitable material and is adapted to be dropped on the ground by gravity from the storage compartments as the spreader is moved over the ground to mark the ground which has been covered by the spreader. Each of the compartments 57 and 58 is provided with a discharge means for discharging the marking material when the spreader is in operation.

FIGURES 7, 8 and 15 through 18 illustrate a first means for discharging the marking material from the compartments 57 and 58. Each of the compartments 57 and 58 is provided with a similar discharge means and only one will be described and the other will be marked with similar reference numerals followed by the small letter "a." As best seen in FIGURE 15, the compartment 58 is provided with a discharge hole 82 on the lower end thereof. The hole 82 is formed through the compartment bottom end wall 67 at a point adjacent the rear end thereof, and toward the hopper end wall 69. The marking material being discharged from the hole 82 is adapted to fall between the hopper wall 69 and the wall 76 onto the ground in a position adjacent the edge of the ground which has been covered by the spreader and upon which material has been deposited from the spreader compartment 56. The bottom wall 66 of the compartment 57 is also provided with a similar hole 82a as shown in FIGURE 15.

The plates 78 and 79 which form the intermediate walls for the material marking compartments 57 and 58 are slidably mounted in place and removable in case it is desired to not use the marking material and to employ the entire capacity of the hopper for holding material which is to be spread onto the ground.

As shown in FIGURES 7 and 16 through 18, the compartment 58 is provided with a marking material flow control valve comprising the rod 83 which is vertically disposed and has the lower end pointed and which is adapted to pass through the discharge hole 82 for blocking the flow of material through the same when the rod 83 is in a lowered position as shown in FIGURE 17 by the dotted line position indicated by the numeral 84. The rod 83 which functions as a flow control valve is secured in place on the inner side of the hopper rear wall 60 by means of the bracket generally indicated by the numeral 85. The bracket 85 is substantially C-shaped and comprises the spaced apart horizontal inwardly extending arms 86 and 87. The bracket arms 86 and 87 are integrally connected to the vertically disposed arm 88 which is secured to the hopper wall 60 by any suitable means as by the rivets 89. The lower bracket arm 87 is provided with the hole 90 through which is slidably mounted the rod 83. The bracket upper arm 86 is provided with a similar hole 91 for guiding the upper end of the rod 83. The valve rod 83 is provided with a cross-handle 92 which is integrally formed on the upper end thereof. Spaced apart from the handle 92 and downwardly therefrom is an outwardly extended arm 93 which is integrally formed with the rod 83. The arm 93 is provided to hold the valve rod 83 in the open position as shown in FIGURE 17. It will be seen that the rod 83 may be turned in the holes 90 and 91 so as to bring the arm 93 in alignment with the hole 94 formed in the bracket arm 86 as shown in FIGURE 18. It will be seen that the hole or slot 94 communicates with the rod hole 91 whereby the arm 93 may be moved downwardly through the same to permit the rod 83 to be moved downwardly to the closed position indicated by the numeral 84 in FIGURE 17. The valve rod 83 is adapted to be downwardly moved to the closed position by means of the spring 95 which is mounted around the rod 83 and has the upper end thereof in abutment with the lower side of the bracket arm 86. The lower end of the spring is adapted to be engaged by a suitable member mounted on the rod 83, as for example, the cotter key 96. It will be seen that the spring 95 maintains a downward bias on the rod 83 to maintain it in the closed position when it is not manually moved to the open position shown in FIGURES 16 and 17. FIGURE 17 shows the lower pointed end of the rod 83 partially disposed in the discharge hole 82 so as to permit the marking material to pass around the pointed end of the rod and downwardly out through the discharge hole 82. The amount of opening premitted by the pointed end of the rod 83 depends upon the position of the arm 93 relative to the lower end of the rod and the angle of taper of the pointed end of the rod. These are matters of adjustment in accordance with the desires of the operator.

FIGURES 12, 13 and 14 illustrate the modified discharge means for regulating the flow of marking material from the compartments 57 and 58. The discharge means of the compartment 58 will be described in detail and the corresponding parts for the discharge means in compartment 57 will be marked by similar reference numerals followed by the small letter "a." The flow control valve means controlling the flow of marking material as shown in FIGURES 12, 13 and 14, comprises a horizontally disposed rod 98 which is swingably mounted inside of the compartment 58 at the rear end thereof and adjacent the rear hopper wall 60. The rod 98 is swingably mounted in the angle members 99 and 100 which are fixedly secured to the bottom wall 67 of the compartment 58 by any suitable means as by rivets, or the like. As best seen in FIGURE 14, the valve rod 98 is provided with a semicircular integral portion 101 which is disposed above the discharge hole 82. When the valve rod 98 is in the solid line position as shown in FIGURE 14, the marking material will be able to flow freely through the hole 82. When the rod 98 has been turned 180°, it will bring the portion 101 into the dotted line position shown at 102, so as to close the hole 82 and stop the flow of marking material therethrough. It will be understood that the hole 82 will be formed so as to fit the lower configuration of the rod portion 101 when it is in the position 102 so as to close the hole 82. The outer end of the valve rod 98, extends through a suitable hole in the hopper end wall 65 and has the outwardly extended portion 103. As shown in FIGURES 12 and 13, the outer end of the rod portion 103 is integrally connected to the downwardly extended arm 104 which is in turn integrally connected to the horizontal inwardly extended rod or shaft 105. A roller 106 is rotatably mounted on the rod 105 and is adapted to engage the periphery of the wheel 77, when the rod 105 is in the solid line position shown in FIGURES 12 and 13. When the wheel 106 is in the position shown in FIGURE 12, the valve closure member 101 on the rod 98 is in the solid line position shown in FIGURE 14, whereby when the wheel 77 is rotated, it will agitate the roller 106 and vibrate the rod 98 backwardly and forwardly, to move the member 101 backwardly and forwardly in the compartment 58, to agitate the marking material therein. When the roller 106 is moved to the dotted line position shown by the numeral 107 in FIGURE 12, the valve closure member 101 on the rod 98 will be moved to the dotted line position 102 in FIGURE 14 to close the discharge hole 82.

The agitator 28a is constructed the same as the agitator 28 for the first embodiment and it is supported on the shaft 25a which is in turn rotatably mounted in the bushings 53a and 54a in the same manner as in the first embodiment. The hopper of the second embodiment would be provided with the same type of support arms as 33 and 34 of the first embodiment for supporting the shutter or plate 38a which is the same construction as the shutter 38 for the first embodiment. These last mentioned structural elements are the same as the first embodiment and have been merely indicated in FIGURES 7 and 12 by dotted lines.

FIGURES 7 and 8 and 19 through 23, illustrate an improved structure for adjustably mounting the agitator 28a in the hopper whereby it is possible to adjust the agitator upwardly and downwardly to accommodate material which is to be discharged from the spreader and which is of various granular sizes. The adjustment means is the same on each end of the hopper and the stducture on one end thereof will be described, and the similar structure on the other end will be marked with the same reference numerals followed by the small letter "a."

As shown in FIGURE 19, the hopper end wall 69 is provided with the vertically disposed oblong hole 108 through which is adapted to pass the agitator mounting shaft 25a for rotatable support by the bushing 54a. As shown in FIGURE 23, the agitator shaft supporting bushing 54a is adapted to be supported in the hole 109 which is formed in the vertically disposed adjuster plate 110. The adjuster plate 110 is slidably mounted on the inner face of the hopper end wall 69 by the following described structure.

An L-shaped bracket generally indicated by the numeral 111 is fixedly secured to the inner surface of the hopper end wall 69 by any suitable means as by being spot welded thereto as indicated by the numerals 112, in FIGURE 19. The bracket 111 is disposed above the oblong shaft hole 108 and includes the vertical leg 113 and the integral inwardly extended leg 114. The leg 114 is provided with a vertical hole 115 which is threaded and in which is threadably mounted the adjusting screw 116. The lower end of the adjusting screw 116 is provided with the enlarged head 117. The lower end of the adjusting screw 116 is rotatably mounted through a suitable hole in the retainer bracket 118 which is fixedly secured as by spot welding to the horizontal inwardly extended arm 119 which is integrally connected to the upper end of the adjuster plate 110. It will be seen that when the adjusting screw 116 is threaded through the hole 115 so as to move the screw 116 outwardly, the adjuster plate 110 will also be moved upwardly. The enlarged head 117 permits the screw 116 to be turned relative to the bracket 118 and retain the same on the screw 116, yet permit adjustment of the plate 110. As shown in FIGURES 7, 19 and 20, the aforedescribed adjuster plate 110 is adapted to be guided in its upward and downward travel relative to the oblong hole 108 by means of the angle guide members 120 and 121 which are fixedly secured to the hopper end wall 69 by any suitable means as by spot welding.

FIGURES 7 through 11, and 24 through 27 illustrate a modified means for adjusting the shutter plate 38a to adjust the amount of opening of the discharge holes 63 in the bottom end of the hopper 55. In the modified structure shown in the last mentioned figures, the adjusting bar 44 for the shutter plate 38a is provided with the upturned end 45 and the indicating pointer 46 at the upper end thereof in the same matter as the first embodiment of FIGURES 1 through 6. The pointer 46 is adapted to abut the tapered front end of the gauge plate 15a in the same manner as the first embodiment. The modified gauge plate 15a is mounted for adjustable movement sidewise on the cross bar 14 which is the same type mounting bar as shown in the first embodiment. The cross bar 14 is held on the spreader handle members 11 and 12 as in the first embodiment. The pointer 46 is adapted to be urged into engagement with the tapered front edge of the gauge plate 15a by means of rod 49a which is provided with the handle 50a. The rod 49a is adapted to pass through suitable holes in the legs 122 and 123 of a C-shaped supporting bracket. The C-shaped supporting bracket is provided with the inter-connecting plate 124 which is fixed to the lower side of the cross-bar 14 by any suitable means as by welding. Mounted around the rod 49a is the spring 125 which has the rear end in abutment with the inner side of the bracket leg 123 and the other end in engagement with a cross pin 126 mounted through the rod 49a. It will be seen that the spring 125 urges the rod 49a to the left or downwardly as viewed in FIGURES 7 and 25. The spring 125 thus tends to bias the rod 49a so as to move the pointer 46 away from the gauge plate 15a. As shown in FIGURE 25, the supporting arm 45 of the pointer 46 is provided with a hole through which passes the rod 49a and this rod is fixedly secured to the arm 45 by any suitable means as by the lock nuts 127 and 128.

The rod 49a is adapted to be adjusted so as to bring the pointer 46 into engagement with the gauge plate 15a. The rod 49a is locked in adjusted position by a friction locking means. As shown in FIGURES 10 and 24 through 26, a U-shaped bracket 129 passes around the rod 49a and is welded to the rear end of the bracket leg 123. A rod 130 is rotatably mounted between the legs of the U-shaped bracket 129 and has the center portion thereof semi-circular or U-shaped in configuration as indicated by the numeral 131 in FIGURES 10 and 24. The rod 130 is provided with the handle 132 which extends rearwardly toward the position of the operator. It will be seen that when the handle 132 is moved downwardly to the solid line position shown in FIGURES 7 and 24, the curved U-shaped portion 131 on the rod 130 will be moved downwardly into engagement with the rod 49a, so as to secure the same by means of a friction grip against the lower end of the U-shaped bracket 129 and hold the same in an adjusted position. When the handle 132 is moved upwardly to the dotted line position 133 shown in FIGURE 7, the U-shaped portion 131 of the rod 130 will be moved away from the rod 49a and the spring 125 will move the rod 49a to the left as viewed in FIGURE 5.

The gauge plate 15a is adjustably mounted on the mounting bar 14 by the following described structure. As shown in FIGURE 26, an elongated plate 134 is centrally mounted on the mounting bar 14 and is secured in position thereon by means of the bolt 135. The plate 134 is a guide plate for the gauge plate 15a and is adapted to be slidably engaged in the gauge plate slot 136, which extends lengthwise of the gauge plate 15a. The bolt 135 passes upwardly through the arm 124 of the bracket which supports the rod 49a, and it may be welded to the arm 124. The gauge plate 15a is adapted to be secured in an adjusted position on the mounting bar 14 by means of the locking knob 137 which has a threaded hole through the center thereof for the reception of the upper end of the bolt 135. It will be seen that when the locking knob 137 is screwed downwardly into engagement with the gauge plate 15a, it will lock the same in an adjusted position on the mounting bar 14.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. A spreader of the class described, comprising: a hopper having an arcuately shaped bottom and having a plurality of spaced apart openings in its bottom; traction wheels mounted on said hopper; a handle projecting outwardly from said hopper for moving the same over a surface; an agitator in said hopper, and upon rotation of said traction wheel, agitating the material in said hopper; an arcuately shaped shutter plate rockably mounted on said hopper for rocking movement between a covering position and an uncovering position with respect to the openings in said hopper bottom; means for pressing said shutter plate into engagement with said hopper bottom and retaining the same in such engagement while it is moving between the covering and uncovering positions; a bar operatively connected to said shutter plate; means engagable with said bar for moving said shutter plate from the covering to the uncovering position; means for regulating the rocking movement of the shutter plate and the amount of exposure of said openings; spring means for returning said bar and shutter plate into the covering position upon release of the regulating means; and, supporting legs on opposite ends of said hopper for supporting the same in an upright position upon moving of said hopper into said position.

2. A spreader of the class described, comprising: a hopper having an arcuately shaped bottom and having a plurality of spaced apart openings formed in its bottom; an arcuately shaped shutter plate rockably mounted on said hopper for covering and uncovering said openings; means for rocking said shutter plate from the covering to the uncovering position; means for regulating the rocking movement of the shutter plate and the amount of exposure of said openings; means for returning said shutter plate from the uncovering position to the covering position; wheels for supporting said hopper; a foraminate agitator in said hopper for agitating material placed therein upon rotation of said wheels; said hopper being provided with a compartment at each end thereof for storing a marking material therein; each of said marking material storage compartments being provided with a discharge hole; and, means for controlling the discharge of the marking material from said compartments.

3. A spreader as defined in claim 2, wherein: said discharge control means in each of the marking material storage compartments comprises, a flow control valve which is spring biased into closed position in the discharge hole, and which is manually movable to an open position to permit discharge of the marking material through the discharge hole.

4. A spreader as defined in claim 2, wherein: said discharge control means in each of the marking material storage compartments comprises, a horizontally disposed shaft having a projection thereon which is rotatable to a first position to close the discharge hole and to a second position to open the discharge hole; and, roller means connected to the shaft and adapted to engage a wheel of the spreader when the spreader is in operation to rock the shaft and the projection to agitate the marking material in the respective compartment.

5. A spreader of the class described, comprising: a hopper having an arcuately shaped bottom and having a plurality of spaced apart openings formed in its bottom; an arcuately shaped shutter plate rockably mounted on said hopper for covering and uncovering said openings; means for rocking said shutter plate from the covering to the uncovering position; means for regulating the rocking movement of the shutter plate and the amount of exposure of said openings; means for returning said shutter plate from the uncovering position to the covering position; wheels for supporting said hopper; an agitator rotatably mounted over said opening in said hopper for agitating material placed therein upon rotation of said wheels; said agitator being mounted on a shaft; and, means adjustably supporting each end of said agitator shaft for vertical adjustment of the agitator in said hopper.

6. A spreader of the class described, comprising: a hopper having an arcuately shaped bottom and having a plurality of spaced apart openings formed in its bottom; an arcuately shaped shutter plate rockably mounted on said hopper for covering and uncovering said openings; means for rocking said shutter plate from the covering to the uncovering position; means for regulating the rocking movement of the shutter plate and the amount of exposure of said openings; means for returning said shutter plate from the uncovering position to the covering position; wheels for supporting said hopper; an agitator rotatably mounted over said openings in said hopper for agitating material placed therein upon rotation of said wheels; said hopper being provided with a compartment at each end thereof for storing a marking material therein; each of said marking material storage compartments being provided with a discharge hole; means for controlling the discharge of the marking material from said compartments; and, means adjustably supporting said agitator for vertical adjustment in said hopper.

7. A spreader of the class described, comprising: a hopper having an arcuately shaped bottom and having a plurality of spaced apart openings formed in its bottom; an arcuately shaped shutter plate rockably mounted on said hopper for covering and uncovering said openings; means for rocking said shutter plate from the covering to the uncovering position; means for regulating the rocking movement of the shutter plate and the amount of exposure of said openings; means for returning said shutter plate from the uncovering position to the covering position; wheels for supporting said hopper; an agitator rotatably mounted over said openings in said hopper for agitating material placed therein upon rotation of said wheels; and, means adjustably supporting said agitator for vertical adjustment in said hopper.

8. A spreader of the class described, comprising: a hopper having an arcuately shaped bottom and having a plurality of spaced apart openings formed in its bottom; an arcuately shaped shutter plate rockably mounted on said hopper for covering and uncovering said openings; means for rocking said shutter plate from the covering to the uncovering position; means for regulating the rocking movement of the shutter plate and the amount of exposure of said openings; means for returning said shutter plate from the uncovering position to the covering position; wheels for supporting said hopper; an agitator rotatably mounted over said openings in said hopper for agitating material placed therein upon rotation of said wheels; a handle on said hopper; said means for regulating the rocking movement of the shutter plate including a gauge plate adjustably mounted on the hopper handle; said means for rocking the shutter plate including a bar extended to said handle; and, a friction locking means for locking said bar in an adjusted position.

9. A spreader of the class described, comprising: a hopper having an arcuately shaped bottom and having a plurality of spaced apart openings formed in its bottom; an arcuately shaped shutter plate rockably mounted on said hopper for covering and uncovering said openings; means for rocking said shutter plate from the covering to the uncovering position; means for regulating the rocking movement of the shutter plate and the amount of exposure of said openings; means for returning said shutter plate from the uncovering position to the covering position; wheels for supporting said hopper; an agitator rotatably mounted over said openings in said hopper for agitating material placed therein upon rotation of said wheels; a handle on said hopper; said means for regulating the rocking movement of the shutter plate including a guage plate adjustably mounted on the hopper handle; said means for rocking the shutter plate including a bar extended to said handle; a friction locking means for locking said bar in an adjusted position; said hopper being provided with a compartment at each end thereof for storing a marking material therein; each of said marking material storage compartments being provided with a discharge hole; and, means for controlling the discharge of the marking material from said compartments.

10. A spreader of the class described, comprising: a hopper having an arcuately shaped bottom and having a plurality of spaced apart openings formed in its bottom; an arcuately shaped shutter plate rockably mounted on said hopper for covering and uncovering said openings; means for rocking said shutter plate from the covering to the uncovering position; means for regulating the rocking movement of the shutter plate and the amount of exposure of said openings; means for returning said shutter plate from the uncovering position to the covering position; wheels for supporting said hopper; an agitator rotatably mounted over said openings in said hopper for agitating material placed therein upon rotation of said wheels; a handle on said hopper; said means for regulating the rocking movement of the shutter plate including a gauge plate adjustably mounted on the hopper handle; said means for rocking the shutter plate including a bar extended to said handle; a friction locking means for locking said bar in an adjusted position; said hopper being provided with a compartment at each end thereof for storing a marking material therein; each of said marking material storage compartments being provided with a discharge hole; means for controlling the discharge of the marking material from said compartment; and, means adjustably supporting each end of said agitator shaft on said hopper for vertical adjustment of the agitator in said hopper.

11. A spreader of the class described, comprising: a hopper having an arcuately shaped bottom and having a plurality of spaced apart openings formed in its bottom; an arcuately shaped shutter plate rockably mounted on said hopper for covering and uncovering said openings; means for rocking said shutter plate from the covering to the uncovering position; means for regulating the rocking movement of the shutter plate and the amount of exposure of said openings; means for returning said shutter plate from the uncovering position to the covering position; wheels for supporting said hopper; an agitator rotatably mounted over said openings in said hopper for agitating material placed therein upon rotation of said wheels; a handle on said hopper; said means for regulating the rocking movement of the shutter plate including a gauge plate adjustably mounted on the hopper handle; said means for rocking the shutter plate including a bar extended to said handle; a friction locking means for locking said bar in an adjusted position; said hopper being provided with a compartment at each end thereof for storing a marking material therein; each of said marking material storage compartments being provided with a discharge hole; means for controlling the discharge of the marking material from said compartments including a flow control valve which is spring biased into a closed position in the discharge hole and which is manually movable to an open position to permit discharge of the marking material through the discharge hole.

12. A spreader of the class described, comprising: a hopper having an arcuately shaped bottom and having a plurality of spaced apart openings formed in its bottom; an arcuately shaped shutter plate rockably mounted on said hopper for covering and uncovering said openings; means for rocking said shutter plate from the covering to the uncovering position; means for regulating the rocking movement of the shutter plate and the amount of exposure of said openings; means for returning said shutter plate from the uncovering position to the covering position; wheels for supporting said hopper; an agitator rotatably mounted over said openings in said hopper for agitating material placed therein upon rotation of said wheels; a handle on said hopper; said means for regulating the rocking movement of the shutter plate including a gauge plate adjustably mounted on the hopper handle; said means for rocking the shutter plate including a bar extended to said handle; a friction locking means for locking said bar in an adjusted position; said hopper being provided with a compartment at each end thereof for storing a marking material therein; each of said marking material storage compartments being provided with a discharge hole; means for controlling the discharge of the marking material from said compartments including a horizontally disposed shaft having a projection thereon which is rotatable to a first position to close the discharge hole and to a second position to open the discharge hole; and, roller means connected to the shaft and adapted to engage a wheel of the spreader when the spreader is in operation to rock the shaft and the projection to agitate the marking material in the respective compartment.

13. A spreader of the class described, comprising: a hopper having an arcuately shaped bottom and having a plurality of spaced apart openings formed in its bottom; an arcuately shaped shutter plate rockably mounted on said hopper for covering and uncovering said openings; means for rocking said shutter plate from the covering to the uncovering position; means for regulating the rocking movement of the shutter plate and the amount of exposure of said openings; means for returning said shutter plate from the uncovering position to the covering position; wheels for supporting said hopper; an agitator rotatably mounted over said openings in said hopper for agitating material placed therein upon rotation of said wheels; a handle on said hopper; said means for regulating the rocking movement of the shutter plate including a gauge plate adjustably mounted on the hopper handle for transverse adjustments; a transversely sloping lower edge on said gauge plate; said means for rocking the shutter plate including a bar extended to said handle; said bar including an upper end member engageable with the sloping edge of the gauge plate to regulate the rocking movement of the shutter plate; a locking means for locking said bar in an adjusted position in engagement with the gauge plate; said hopper being provided with a compartment at each end thereof for storing a marking material therein; each of said marking material storage compartments being provided with a discharge hole; and, means for controlling the discharge of the marking material from said compartments.

14. A spreader as defined in claim 13, including: means for adjustably supporting each end of said agitator shaft on said hopper for vertical adjustment of the agitator in said hopper.

15. A spreader as defined in claim 14, wherein: said means for adjustably supporting each end of the agitator shaft includes a bushing for supporting the shaft; said bushing being mounted on a plate; and, means for adjustably mounting said plate on the hopper for vertical adjustment of the plate and the bushing.

References Cited by the Examiner

UNITED STATES PATENTS

| 2,670,879 | 3/54 | Stach | 222—177 |
|---|---|---|---|
| 2,840,275 | 6/58 | Liljenberg | 222—177 |
| 2,973,884 | 3/61 | Peoples et al. | 222—177 |
| 3,114,481 | 12/63 | West | 222—177 X |
| 3,122,723 | 2/64 | Atkinson | 222—41 |

LOUIS J. DEMBO, *Primary Examiner.*

CHARLES R. CARTER, *Examiner.*